May 9, 1933.  C. E. BRANICK  1,908,311
AIR TIRE SPREADER
Filed July 7, 1927   3 Sheets-Sheet 1

Inventor
Charles E. Branick
By Horan Piele
Attorney

May 9, 1933.  C. E. BRANICK  1,908,311
AIR TIRE SPREADER
Filed July 7, 1927   3 Sheets-Sheet 2

Inventor
Charles E. Branick
By Homan Piele
Attorney

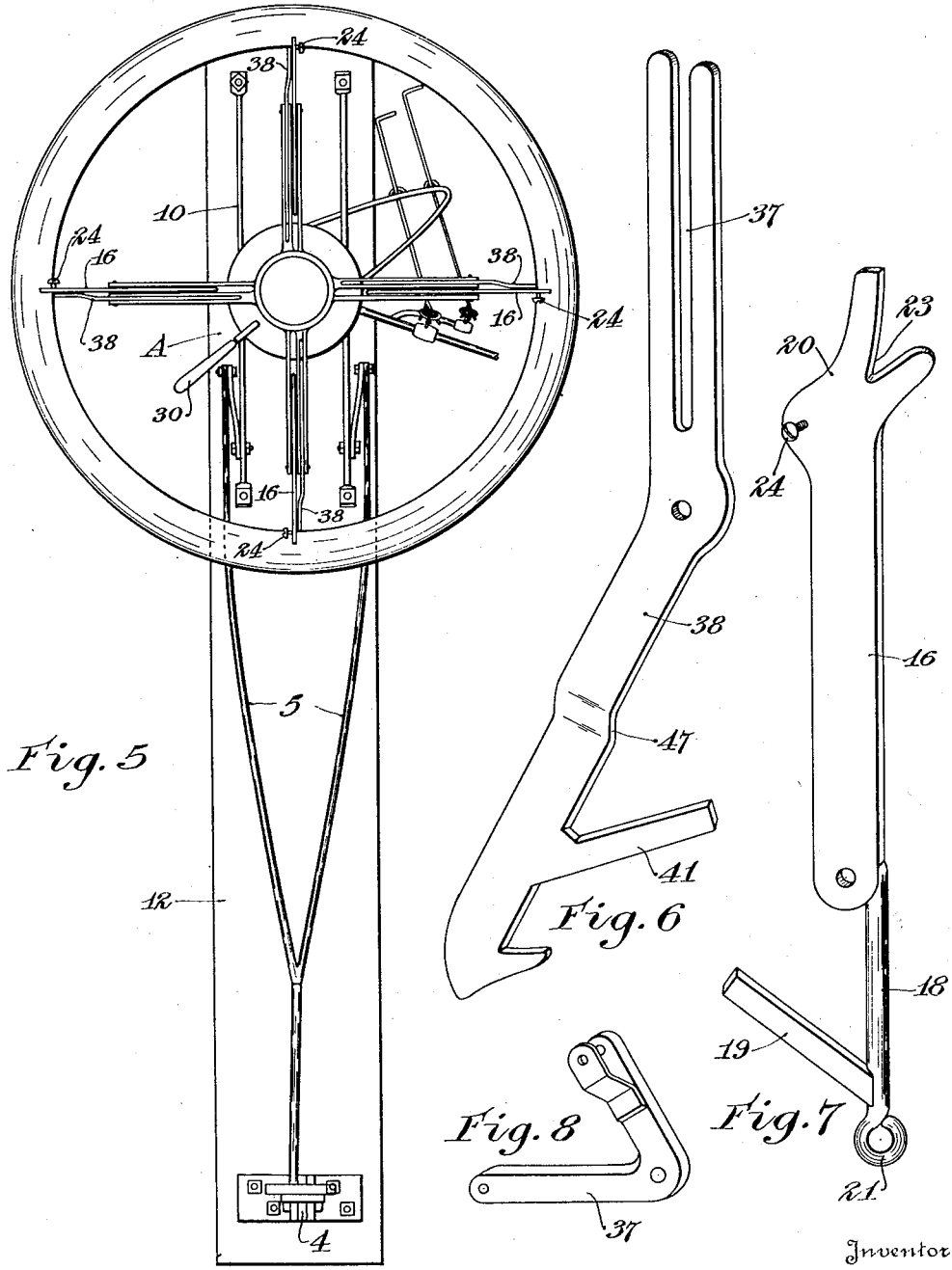

Patented May 9, 1933

1,908,311

UNITED STATES PATENT OFFICE

CHARLES E. BRANICK, OF FARGO, NORTH DAKOTA, ASSIGNOR TO BRANICK MANUFACTURING COMPANY, INCORPORATED, OF FARGO, NORTH DAKOTA, A CORPORATION OF NORTH DAKOTA

AIR TIRE SPREADER

Application filed July 7, 1927. Serial No. 204,097.

My invention relates to an improvement in tire spreaders wherein it is designed to provide means to spread the tire quickly by air pressure. The operation of the spreader is simple to adjust it to the tire, and air pressure operates the spreading means to expand the casing uniformly about the same so that the inner surface of the tire can be readily inspected. An apparatus of this nature is desirable in a tire repair shop where tire casings are repaired and an important feature of the invention resides in a means which is adapted to operate quickly to be adjusted to the diameter of the bead of the tire and to spread the tire apart.

A feature of my invention resides in means which include a support for engaging the bead of the casing which is adapted to be adjusted automatically to the diameter of the tire by pressing on a foot lever after the tire has been placed upon the receiving spreading arms.

An object of the invention resides in means for automatically contracting the spreading arms so that they will be contracted to be positioned at a small diameter to receive the tires of a smaller size, yet these arms project from the front of the machine into a position to adapt them to the desired size of the tire as soon as the foot lever is operated. My machine is of a light weight and is adapted to operate to fully spread the tire in position in a few seconds and is designed to take up a small amount of space.

It is also a feature of my invention to provide a safety means which permits the machine to be released quickly if it is desired. This handle is positioned at a convenient point on the machine so that it is easily accessible. This handle also forms a guide to the operator so as to know readily when the tire has been rotated a complete revolution, while inspecting the lining of the same.

Heretofore tire spreaders and holders have been made and used but they are of a complicated nature requiring many operations to adjust the same to the diameter of the casing and also requiring a longer period of time to operate than is accomplished by my tire spreader. I have designed my tire spreader to overcome undesirable features and have borne in mind that a machine of this character may best be operated when of a simple nature having a small number of parts and being light weight, yet sufficiently strong to operate to spread large and small tires.

These features, together with other details and objects of the invention will be more fully and clearly pointed out and described in the specification and claims.

In the drawings forming part of my specification:

Figure 5 is a front view of the same.

Figure 6 illustrates one of the operating arms.

Figure 7 illustrates the other operating arm.

Figure 8 illustrates the bell crank operating lever which is adapted to be connected with the foot lever.

Figures 1, 2:
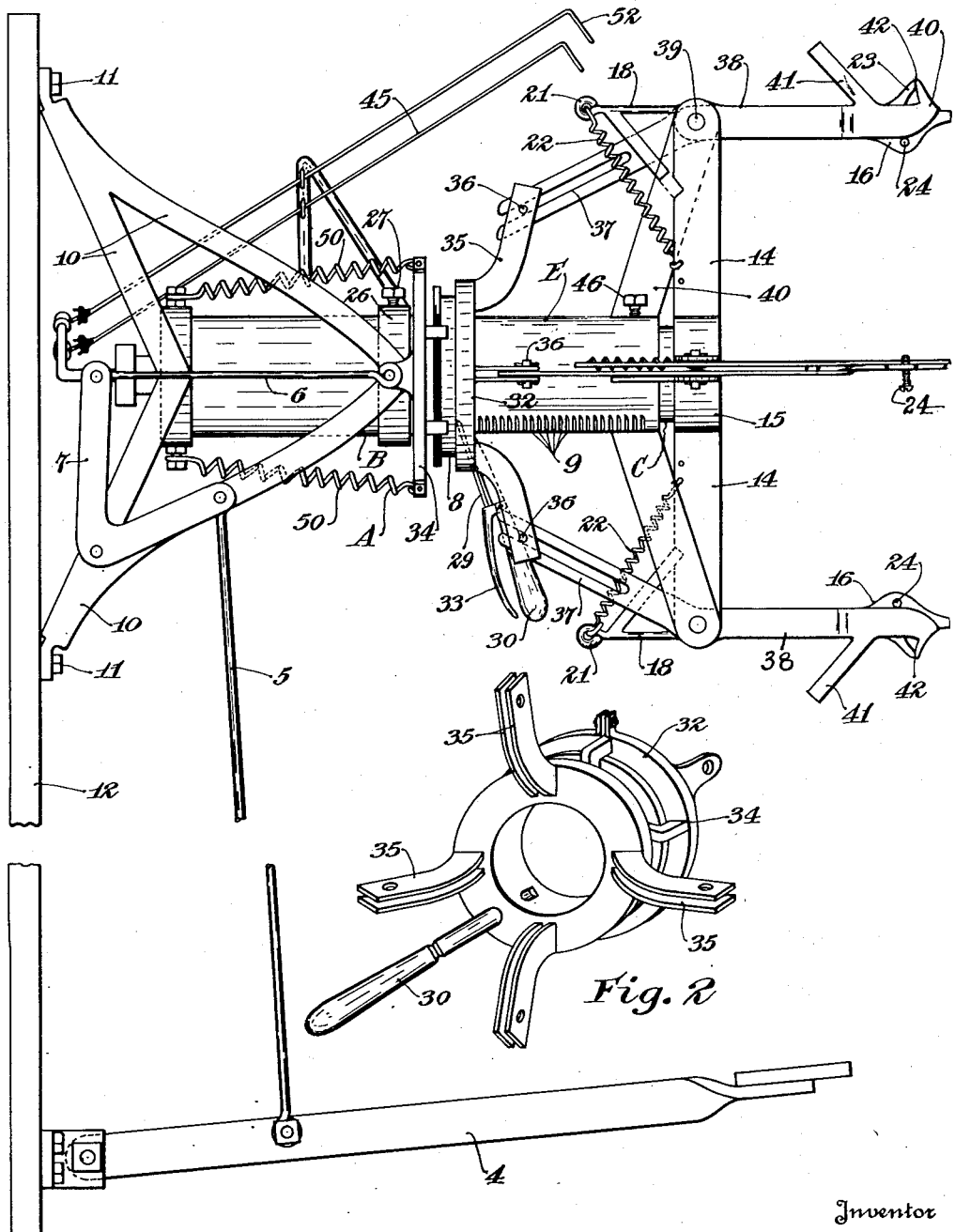
Figure 1 is an enlarged side view of my spreader with a portion of the same being broken away.
Figure 2 is a perspective of a portion of my spreader.

My tire spreader A is of a simple construction having supporting bracket arms 10 which are attached to the wall or wallboard by the bolts 11 in a manner to hold the operating cylinder B in position projecting horizontal from the wallboard 12.

The operating cylinder B is adapted to support the piston C which projects out of the front of the same and which is provided with radial arms 14 projecting from the head 15 of the piston in a manner to extend approximately at right angles to the end of the piston and the head 15 forming supports for the operating spreading arms 16.

Figures 3, 4:
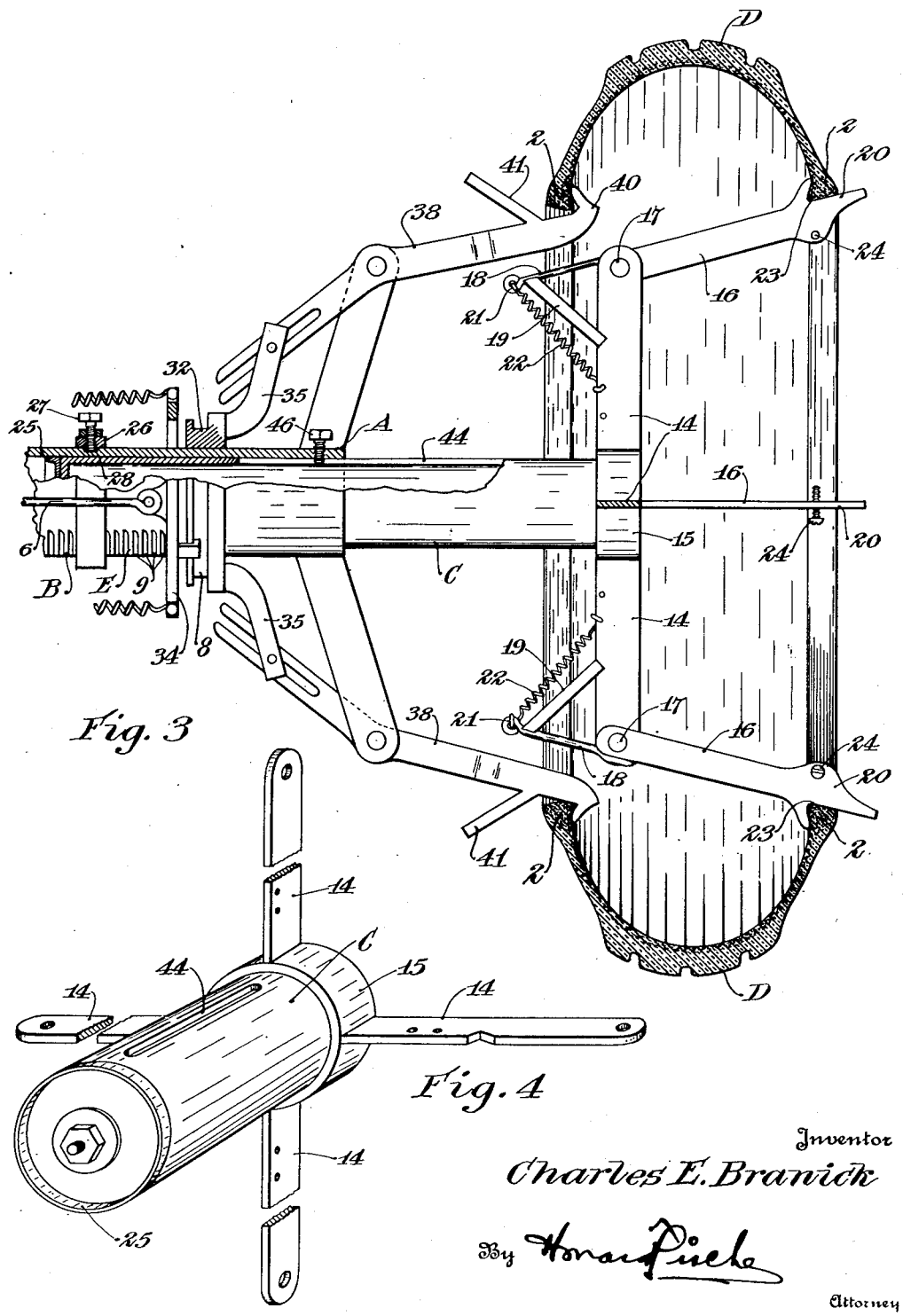
Figure 3 is an enlarged side view of a portion of my spreader.
Figure 4 is a perspective of a portion of my spreader.

The spreading arms 16 are adapted to be pivotally supported at 17. These arms are formed with an end portion 18 which extends back from the pivot point 17 and carries the stop lug 19 which is adapted to operate to limit the outward expanding of the free ends 20 in operation. The portion 18 is formed with an eye 21 which connects with the coil spring 22. One end of the springs 22 are secured to the radial arms 14. Thus the arms 16 are adapted to be drawn in a manner to cause the free end 20 to expand when they are free by the action of the coil springs 22. The free ends 20 are provided with a peculiarly shaped head portion which is formed with a recess 23 adapted to engage the bead 2 of the tire D, as illustrated in Figure 3, in spreading the tire casing. The free ends 20 of the arms 15 are provided with a pin 24 the purpose of which will be hereinafter described.

The piston C is formed with a packing of leather or other suitable material such as 25 illustrated in Figures 3 and 4. This packing operates in the cylinder B so that the piston C may be operated by air to force the same out into the position illustrated in Figure 3.

I provide a collar 26 on the cylinder B which carries a bolt 27, the inner end of which extends into the annular groove 28 formed in the sleeve E. This bolt 27 permits the sleeve E to be rotated and holds the same in position in the cylinder B, as illustrated in Figure 3. The sleeve E extends out of the front of the cylinder B and in which the piston C slides. This sleeve E is formed with a series of slits or indentations 9 which are adapted to receive the operating tongue 29 of the handle 30. The handle 30 is carried by a slidable collar 32 so that the handle will move along the sleeve E when the collar 32 is reciprocated on the sleeve E. The sleeve catch 29 is adapted to engage in the slots 9 and is so positioned that the catch will slide over the slots in one direction, but will hold the collar 32 from moving in the other direction. The handle 30 is provided with a releasing tongue 33 which is adapted to withdraw the catch or tongue 29 from the slots or indentations 9 to release the collar 32 so that it may be moved backward. The collar 32 is provided with an engaging member 34 which engages in the annular recess 8 formed in the collar and which is adapted to be operated by the rod 6 which connects with the bell crank lever 7, and this bell crank lever is connected by the rod 5 to the foot pedal 4. Thus when the foot pedal 4 is operated or depressed the rod 6 will force the collar 32 in a forward direction along the sleeve E, causing the spring tooth 29 to engage in the slots 9 or to ratchet over the same until the collar is moved to the desired position, the handle 30 with its connecting parts functioning to hold the collar 32 in operative position and the collar 32 may be readily released by operating the handle 30, releasing the spring catch 29. This permits the collar to move in a backward direction. The collar 32 carries a series of bifurcated arms 35 which are provided with a pin 36 on their outer ends which operate in the slots 37 of the lever arm 38. This arm 38 is pivoted at 39 to the free ends of the radial arms 40 extending from the front end of the sleeve E and disposed adjacent the outer ends of the arms 14. The lever 38 is illustrated in perspective view in Figure 6. This lever 38 is formed with a hook 40 on the outer end of the same and is provided with a guide arm 41 backward of the hook which forms a guard for one side of the bead of the tire D. When the tire spreader A is contracted with the parts in the position illustrated in Figure 1, the end of the hook 40, together with one side of the end 20, acting together, form a V-shaped member such as 42 illustrated in Figure 1 which permits the bead of the tire D to be dropped on to the V-like portion 42 and the guard 41 holds the tire from sliding back too far in relation to this V-like portion. Thus when the tire D is placed on the contractor spreader A, as the parts are illustrated in Figure 1 without the tire thereon, the V-like portion 42 enters between the respective beads of the casing and when it is desired to expand the tire or spread the beads 2 apart the air is applied to the cylinder B and the piston C operates to push the arms 16 outward away from the arms 38, spreading the tire as illustrated in Figure 3. When the tire is placed on the spreader A before the spreader is operated, the foot lever 4 is depressed, forcing the collar 32 with the arms 35 engaging the slots 37, thus expanding collectively the arms 16 and 38. The pin 24 is caused to engage against the back of the free end of the lever 38 by the springs 22, so that the free ends of the arms 16 will follow along with the expanding action of the free ends of the arms 38, as the foot lever 4 is depressed.

After the foot lever has been pressed downward and the arms, there being four in number, such as 38 and 16, have expanded to the size of the bead of the tire D and engaged within the same, then the air is applied by means of the operating lever 45 which turns on the air to the cylinder B and forces the piston C out sufficiently to expand or spread the beads 2 of the tire casing D apart. In this expanded position the tire is held by the collar 32 and the tire with its holding arms 16 and 38 may be rotated to fully inspect the inner surface of the same.

The piston C is provided with a longitudinal slot 44 which is adapted to be engaged by the screw 46 carried by the collar 32. This slot and set screw limit the movement of the piston C and also hold the arms 16 in line with the arms 38 so that when the arms 16 and 38 come together in contracted position as illustrated in Figure 1, then the arms extend adjacent each other and in line so as to be practically within the same plane. The arm 38 is provided with an offset portion 47 so as to cause the free end of the same to virtually bear against the side of the outer free end of the arm 16. Thus when the arms 16 and 38 are contracted into the position illustrated in Figure 1, the free end of the arm 38 will strike against the pin 24 and carry the arm 16 in line with the arm 38, expanding the spring 22.

The collar 34 is engaged by a pair of coil springs 50 which are adapted to normally pull the collar 32 in a backward position or up against the collar 26. Thus when the handle 30 is engaged and the tongue 33 releases the catch 29 from the slots 9 of the sleeve E, the sleeve is released and the coil springs 50 draw the same back into position to move the levers 38 into the contracted position illustrated in Figure 1.

In operating my tire spreader A the tire is first placed on the arms 16 and 38 in their contracted position as illustrated in Figure 1. Then the foot lever 4 is pressed to expand the arms 16 and 38 collectively between the beads of the casing. The catch and handle 30 hold the arms in this expanded position. Then the air lever 45 is operated which pushes the piston C out and spreads the tire as illustrated in Figure 3 by the arms 16. The inner surface of the tire may then be inspected and the handle 30 forms a guide to the operator to know when the tire has been fully rotated. If it is desired this handle may be painted red or white or any suitable color so as to attract the operator and to facilitate his easy knowing that the tire has been fully inspected as he rotates the same.

After the tire has been inspected and repaired, if desired, the spreader A is operated to release the tire D by shutting off the air lever 45 and operating the release lever 52. Then the handle 30 is released so that the catch 29 is disengaged from the slots 9 and the springs 50 draw the collar 32 into position to cause the lever 38 to contract and engage against the pins 24, contracting the lever 16. The tire may then be easily lifted off of the supporting arms.

The arms 16 and 38 are quickly adjustable by the foot lever 4 to the diameter of the tire. The guards 41 guide the tire casing D so that the bead 2 of the same will drop or cause to be dropped over the V-shaped portion 42 formed by the ends of the levers 38 and 16, so that when the arms 16 are moved away from the arms 38 the tire will be engaged on one side by the hooks 40 and on the other side by the notches 23, spreading the same apart. The spreading means of my tire spreader A consist namely of the radially disposed supporting arms 38 and 16 which may be termed as pairs or sets, one set pulling in one direction on the side of the casing, and the other set pushing in the other direction. Thus by pneumatic pressure the tire is virtually instantaneously spread apart when my spreader A is operated.

Thus the simplicity of my tire spreader is apparent and also the compact construction which is clearly illustrated in the drawings, showing that the tire spreader A may be fastened to the wall or a wallboard and the rigid frame 10 is adapted to hold the operating cylinder B in horizontal position with the other operating members including the sleeve A and the piston C in compact relation to each other when the parts of the spreader are in an inoperative position. My spreader is so easily operated that the operator may spread a large or small tire in just a few seconds without very much physical exertion excepting lifting of the tire casing D on to the operating arms 16 and 38. The air pressure expands the casing and a tire repair shop usually has compressed air for blowing up the tires so that my spreader is very adaptable for its purpose and is much faster than any other spreader in so far as I know, making it much to be preferred over types of spreaders where it is necessary to adjust the same by means which take considerable time and force of the operator. I have found my spreader to be of a very desirable nature to accomplish the purposes desired.

In accordance with the patent statutes I have described the principles of operation of my tire spreader and while I have illustrated in the drawings a particular formation and construction and arrangement of the parts, I desire to have it understood that the same is only illustrative of a means of carrying out my invention and that such changes as may be obviously apparent within the scope of the following claims may be made without departing from the spirit of my invention.

I claim:

1. A tire spreader including, two sets of supporting members to support the casing in a vertical position, means for adjusting said members to the diameter of each bead of the tire casing, a pneumatic piston, one of said sets of members secured thereto, and means for spreading the entire tire simultaneously by air pressure to permit free inspection of the inner area of the tire casing.

2. An auto tire casing spreader including, means for supporting said casing vertically, and bead engaging means for instantaneously forcing the beads apart to spread the entire casing by pneumatic pressure.

3. A tire casing spreader including, means for supporting the casing vertically, and means for spreading the same including a pair of adjacent arms lying within the casing adapted to engage within the tire casing and to move away from each other in close proximal parallel planes.

4. A casing spreader for auto tires comprising, a cylinder adapted to be mounted horizontally on the wall, means for supporting the same, a sleeve rotatably positioned within said cylinder having radial arms projecting from the same, a collar slideable on said sleeve, operating arms engaged by said slideable collar, said operating arms being pivoted to said radial arms, a piston reciprocable in said sleeve and cylinder having radial arms extending parallelly with said first radial arms, and casing engaging arms carried by said last mentioned radial arms and adapted to lie adjacent said operating arms carried by the first mentioned radial arms whereby said operating arms and said casing engaging arms are adapted to spread a casing when said spreader is operating with the casing on said arms.

5. A tire spreader including, a horizontally extending cylinder, a piston operable within said cylinder adapted to support tire engaging arms, a sleeve carried by said cylinder adapted to support tire engaging arms, means for adjusting said tire engaging arms collectively to expand the same to the size of a tire casing, and means for separating said tire supporting arms by the operation of said piston to spread the tire casing.

6. A tire spreader comprising, a cylinder, a piston, a rotatable sleeve, said piston and said sleeve being provided with radially extended arms adjacent each other, tire supporting arms carried by said radial arms, and a collar carried by said sleeve adapted to operate said arms to expand and contract the same.

7. A tire spreader comprising, a cylinder, a piston, a rotatable sleeve, said piston and said sleeve being provided with radially extended arms adjacent each other, tire supporting arms carried by said radial arms, a collar carried by said sleeve adapted to operate said arms to expand and contract the same, and a spring catch on said collar adapted to hold the same in position to hold said tire supporting arms in expanded position when adjusted to the size of the tire casing supported by the same.

8. A tire expander including, an operating cylinder, a piston, a sleeve interposed between said piston and cylinder adapted to project from said cylinder, adjustable tire supporting arms carried by said piston and sleeve, and means for adjusting said arms collectively to the diameter of a tire casing.

9. A tire spreader including, means for supporting a tire, said supporting means comprising parallel arms positioned adjacent each other, means for operating said arms collectively to adjust the same to the size of the tire, and means for separating said arms to spread the tire casing supported thereon.

10. A tire spreader adapted to be operated by air pressure including, a cylinder, supporting arms for a tire casing, said arms being adapted to normally lie in a parallel plane with each other and having hook and shoulder means adapted to engage the bead of the casing supported thereon, means for adjusting said arms to the size of the tire, and means for separating said arms by air pressure to spread the side walls of a tire casing apart wide enough to permit free access to the inner surface of the casing.

11. A tire spreader including, supporting arms, means for adjusting said arms to the size of the tire, means for separating said arms to spread the tire, and guard means to cause the tire to be positioned on the operating ends of said arms when it is lifted onto the said arms.

12. A tire spreader comprising pairs of adjustable arms, means for adjusting said arms collectively to the diameter of a tire, means for moving one set of said arms away from the other by pneumatic means to spread the tire casing supported thereon.

13. A tire spreader including, adjustable sets of tire supporting arms, one set of said arms being provided with hooks on the free ends thereof, and guards spaced from said hooks, the other set of said arms being formed with a notch, said hook end and said notch forming a triangular shape when adjacent each other in contracted position, and the set carrying notches being adapted to be moved by air pressure away from the hook ends of the other set whereby the beads of the casing supported by said arms are spread apart to permit the free reciprocation of the inner surface of the tire.

14. A tire spreader including, means for supporting a tire casing by a series of radially disposed arms, means for adjusting said arms to the diameter of the tire, means for spreading said arms apart by pneumatic pressure, means for supporting said arms in a manner to permit the tire casing spread apart thereby to be rotated so that the entire inner area of the tire casing may be inspected by rotating the same.

15. A tire spreader operable by pneumatic pressure including, sets of radially disposed supporting arms, means for collectively adjusting said arms to the size of the tire, means for separating said arms to spread the tire casing supported thereon, and means for rotatably supporting said arms to permit the tire to be rotated when spread apart.

16. A tire spreader including, means for supporting a tire, said supporting means comprising pairs of radially disposed arms, means for adjusting said arms collectively to the diameter of a tire casing by a foot lever, means for holding said arms in adjusted position, and means for separating said arms by pneumatic pressure to spread the casing apart supported on said arms.

17. A tire spreader comprising pairs of radially disposed adjustable supporting arms, means for adjusting said arms to the diameter of the tire by a foot lever, one set of said arms being adapted to engage one bead of the tire, and the other set being adapted to engage the other bead, and means for moving one set of said arms away from the other set by pneumatic pressure to virtually instantaneously spread the entire casing of a tire apart for inspection and repair of the inner surface thereof.

CHARLES E. BRANICK.